Patented July 24, 1934

1,967,388

UNITED STATES PATENT OFFICE 1,967,388

ALLYL SUBSTITUTED ACETAMIDES AND METHOD OF PRODUCING SAME

Karl Ziegler, Heidelberg, Germany, assignor to Schering-Kahlbaum A. G., Berlin, Germany, No Drawing. Application April 2, 1932, Serial No. 602,873. In Germany May 13, 1931

9 Claims. (Cl. 260—124)

My invention refers to chemical compounds having the characteristic action of soporifics and more especially to the amides of certain organic acids, which display this action.

Tertiary acetamides having a non-saturated alkyl group linked to the α-carbon atom, such as for instance diethyl allyl acetamide have already been used as soporifics.

I have now discovered the surprising fact that tertiary amides having two or three non-saturated alkyl groups linked to the α-carbon atom, display special properties as compared with the soporifics hitherto known. Comparative tests with emulsions of the test substances in gum solutions, which were administered to rabbits by means of a siphon sound, showed that the tertiary acetamides substituted with more than one non-saturated alkyl group were considerably more efficient than other soporifics including the diethyl allyl acetamide, the soporific dose being about 30 milligrams per kilogram rabbit, while the other soporifics must be administered in greater doses. Thus for instance the lowest soporific dose of diethyl barbituric acid is 110 milligrams. Even with diethyl allyl acetamide the narcotic action only sets in with a dose of 60 milligrams per kilogram rabbit.

I have further found that in the case of the barbituric acids only a small difference exists between the smallest and the full narcotic dose, in contradistinction to the tertiary amides with more than one non-saturated alkyl group linked to the α-carbon atom displaying a great "therapeutical width", i. e. a considerable difference between the minimum and full narcotic doses.

No such result could be expected, for the connections between constitution and narcotic action are not always such that the presence of a greater number of certain efficient groups also means greater efficiency. Thus for instance according to Fränkel's "Arzneimittel-Synthese" (5th edition, p. 496) the substitution by a single phenyl group in acetamide is known to produce a narcotic action, while the substitution by two phenyl groups, as in diphenyl acetamide, shows no increase in the narcotic effect.

The substitution by saponification is effected in a well known manner. The acetonitriles serving as starting materials can be obtained, according to the method disclosed in my copending application for patent of the United States Serial No. 579,109, filed December 4, 1931, by acting with a metal compound belonging to the group formed by alkali and alkaline earth metal hydrides and substituted or non-substituted alkali metal amides on nitriles, such as acetonitrile or primary or secondary analogous derivatives thereof having the general formula RX, wherein X is halogen and R is a saturated or non-saturated alkyl- or aralkyl- or a non-aromatic isocyclic group, which can in their turn be substituted by atoms or groups non-reacting or only slowly reacting with alkali metal amides, such as halogen atoms, alkoxy-, aryloxy-, arylmercapto- or alkylated amino-groups.

From these starting products I have produced amongst others:

Triallyl acetamide, ethyl diallyl acetamide and n-propyl diallyl acetamide, being colourless crystals melting at 66°, 65° and 53° C., respectively, and dissolving in water only with difficulty but being easily re-crystallizable from petrol ether.

In practicing my invention I may for instance proceed as follows:

Example 1

200 parts by weight triallyl acetonitrile are boiled 5 hours under the reflux condenser in a solution of 140 parts caustic potash in 1200 parts butanol. When the reaction has come to an end, the butanol is distilled off with steam. On cooling down the residue solidifies in the form of crystals. After filtration by suction it is washed with water to remove the alkali, thereafter dried and recrystallized repeatedly from petrol. The triallyl acetamide thus obtained having the formula

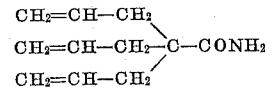

is a white crystalline mass melting at 63–65° C., dissolving readily in organic solvents, less readily in cold petrol and being practically insoluble in water.

Example 2

149 parts diallyl ethyl acetonitrile are boiled 5 hours under the reflux condenser in a solution of 114 parts caustic potash in 1000 parts butanol. After the reaction has come to an end, the reaction mixture is treated further as described with reference to Example 1.

The diallyl ethyl acetamide thus obtained, which has the formula

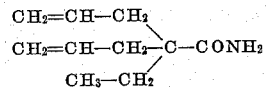

melts at 65° C. It is white-coloured and crystalline and behaves from a chemical point of view similarly to the triallyl acetamide.

Example 3

300 parts diallyl-n-propyl acetonitrile are boiled 5 hours under the reflux condenser in a solution of 208 parts caustic potash in 1800 parts butanol. The reaction product is treated as described with reference to Example 1.

The diallyl-n-propyl acetamide thus obtained, which has the formula

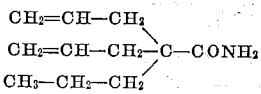

melts at 53° C. and has similar chemical properties as the other amides cited above.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. As new products, tertiary acetamides substituted by non-saturated radicles, having the formula

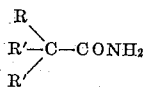

wherein R' is an allyl radicle, R a saturated alkyl radicle or an allyl radicle, these products being colourless substances dissolving in water only with difficulty and having a powerful narcotic action.

2. As a new product, triallyl acetamide having the form of colourless crystals melting at 66° C. and dissolving in water only with difficulty, the product having a powerful narcotic action.

3. As a new product, ethyl diallyl acetamide having the form of colourless crystals melting at 65° C. and dissolving in water only with difficulty, the product having a powerful narcotic action.

4. As a new product, n-propyl diallyl acetamide having the form of colourless crystals melting at 53° C. and dissolving in water only with difficulty, the product having a powerful narcotic action.

5. The method of producing tertiary acetamides substituted by allyl radicles and having a powerful narcotic action, comprising converting a tertiary acetonitrile having more than one allyl group linked to the α-carbon atom into the corresponding amide.

6. The method of producing tertiary acetamides substituted by allyl radicles and having a powerful narcotic action, comprising alkylating acetonitriles to produce tertiary acetonitriles having more than one allyl group linked to the α-carbon atom and acting on these nitriles with a caustic alkali for saponification.

7. The method of producing triallyl acetamide comprising acting on triallyl acetonitrile with caustic alkali for saponification.

8. The method of producing diallyl ethyl acetamide, comprising acting on diallyl ethyl acetonitrile with caustic alkali for saponification.

9. The method of producing diallyl-n-propyl acetamide, comprising acting on diallyl-n-propyl acetonitrile with caustic alkali for saponification.

KARL ZIEGLER.